United States Patent [19]

Steinke

[11] Patent Number: 5,131,181

[45] Date of Patent: Jul. 21, 1992

[54] ONE LEGGED FROG FISH LURE

[76] Inventor: Scott Steinke, 1868 Birch St., Becker, Minn. 55308

[21] Appl. No.: 678,857

[22] Filed: Apr. 1, 1991

[51] Int. Cl.⁵ .............................................. A01K 85/00
[52] U.S. Cl. ................... 43/42.36; 43/42.28; 43/42.3
[58] Field of Search ............ 43/42.36, 42.35, 42.28 X, 43/42.29, 42.3 X, 44.82

[56] References Cited

U.S. PATENT DOCUMENTS

| | | | |
|---|---|---|---|
| 1,881,947 | 10/1932 | Rawdon | 43/42.3 |
| 2,491,846 | 12/1949 | Boekenoogen et al. | 43/42.3 |
| 2,504,229 | 4/1952 | Sinclair | 43/42.3 |
| 2,611,205 | 9/1952 | Steel | 43/42.3 |
| 3,376,663 | 4/1968 | Amrine | 43/42.3 |
| 3,868,784 | 3/1975 | Sabol | 43/42.3 |
| 4,437,257 | 3/1984 | Kluge | 43/42.45 |
| 4,856,223 | 8/1989 | Evans | 43/42.24 |

Primary Examiner—Richard K. Seidel
Assistant Examiner—Chuck Y. May
Attorney, Agent, or Firm—Palmatier & Sjoquist

[57] ABSTRACT

An improved artificial fishing lure simulating in motion and appearance an injured frog bait. The invention in body shape, coloring, and single-leg vibration is designed to glide above the surface of the water imitating the motions of an injured frog. The lure is constructed of a resilient flexible material such as a durable elastic polyurethane plastic. A hook shank is inserted into a hollow internal cavity and the hook and barbs are positioned to interact with a depression formed in the top rear of the upper body. The positive buoyancy and design of the lure continuously maintains the lure in an upright configuration with respect to the water surface. The body design of the lure promotes an extremely efficient weedless character of the artificial frog bait simulating the natural bait in all desired respects.

22 Claims, 3 Drawing Sheets

ONE LEGGED FROG FISH LURE

BACKGROUND OF THE INVENTION

The present invention relates to artificial lures for fishing, and more particularly to an artificial lure which simulates an injured frog.

Artificial lures which simulate frogs are generally known in the art. For example, U.S. Pat. No. 1,833,522, issued Nov. 24, 1931, discloses a simulated frog lure which may be pulled through the water at a predetermined depth, and which has movable body parts. U.S. Pat. No. 1,888,221, issued Nov. 22, 1932, discloses a simulated frog lure having movable legs. U.S. Pat. No. 4,885,867, issued Dec. 12, 1989, discloses a simulated frog lure having a tail structure including a coiled center extension.

In order for an artificial lure to be effective in catching fish, the lure must approximate the appearance and motions of a targeted natural bait source. The present invention imitates the appearance and the motions of an injured frog bait as the lure is drawn through the water by a fisherman. The invention is designed to avoid entanglement with almost all varieties of marine vegetation.

SUMMARY OF THE INVENTION

An improved artificial fishing lure simulating in motion and appearance an injured frog. The invention in body shape, coloring, and single leg construction is designed to glide on the surface of the water imitating the motions of an injured frog. The invention is constructed of a resilient flexible material such as a hollow elastic polyurethane plastic.

In this invention a hook shank is inserted into the cavity and the hook and barbs are positioned to interact with a depression formed in the top rear of the upper body. The hook shank adds a desired amount of weight to the underside of the lure body. The positive buoyancy and design of the lure continuously maintains the lure in an upright configuration with respect to the water surface. The body design of the invention promotes an extremely efficient weedless character of the artificial bait, simulating the natural bait in all desired respects.

An object of the invention is to catch large numbers of sport fish within the limits established by law.

Still another object of the invention is to provide a novel artificial fishing lure which will glide over the surface of water, realistically imitating the appearance and actual movements of an injured natural frog as the lure is drawn through the water by a fisherman.

A feature of the invention is the construction of the lure from soft, durable, resilient, flexible polyurethane plastic providing the lure with a lifelike texture.

Another feature of the invention is the novel body design with a relatively oval and flat underside, a hollow interior, and various upper cavity recesses, imitating the appearance of a natural frog.

Still another feature of the invention is a double-hook shank fitting through the interior of the lure from rear to front, with the hook shank located inside the hollow interior.

Still another feature of the invention is the angled bend to the eye loop at the front of the hook shank, providing increased motion of the lure as drawn through the water.

Still another feature of the invention is the shank of the hook disposed inside the hollow cavity adding weight to the underside of the lure, thereby, promoting the upright orientation of the lure in the water.

Still another feature of the invention is the cavity recess located on the top rear surface of the lure providing for sheltered placement of the hook and barbs, thereby, preventing entanglement of the lure with marine vegetation or obstructions.

Still another feature of the invention is a resiliently flexible boot, shaped in the form of a leg, fitted over one prong of the double-hook shank projecting from the rear of the lure.

Still another feature of the invention is the stability of the lure as a result of the boot which prevents the lure from rolling about a longitudinal axis while drawn through the water.

Still another feature of the invention is the turbulence created by the resiliently flexible boot leg as the lure is drawn through the water, thereby attracting fish.

Another alternative feature of the invention is thicker body material weighting the underside to assist in maintaining the lure in an upright orientation as the lure floats or is drawn through the water.

Still another feature of the invention is the positive buoyancy of the lure where the lure remains upon the surface upon cessation of moment of the lure through the water.

DETAILED DESCRIPTION OF THE PREFERRED EMBODIMENT

One form of the invention is illustrated and described herein. The crippled frog fish lure is indicated in general by the numeral 10. The lure 10 is generally used in sport fishing for any species of fish attracted to natural frog bait. The fishing lure 10 is preferably formed of a resiliently flexible material including polyurethane plastic or rubber. The lure 10 is generally of one-piece molded construction. The lure 10 is generally in the shape of an ellipsoid having a hollow interior, with a rearward extending leg 31. The lure 10 is designed to imitate the natural motions of an injured frog while traveling on the surface of a body of water. The lure 10 may be artistically colored in any spectrum of colors or markings either to specifically imitate the natural appearance of various types of frogs, or a generic all-purpose fishing lure. The lure 10 is designed to continuously float and remain as a surface lure during use in fishing.

Figure 1:
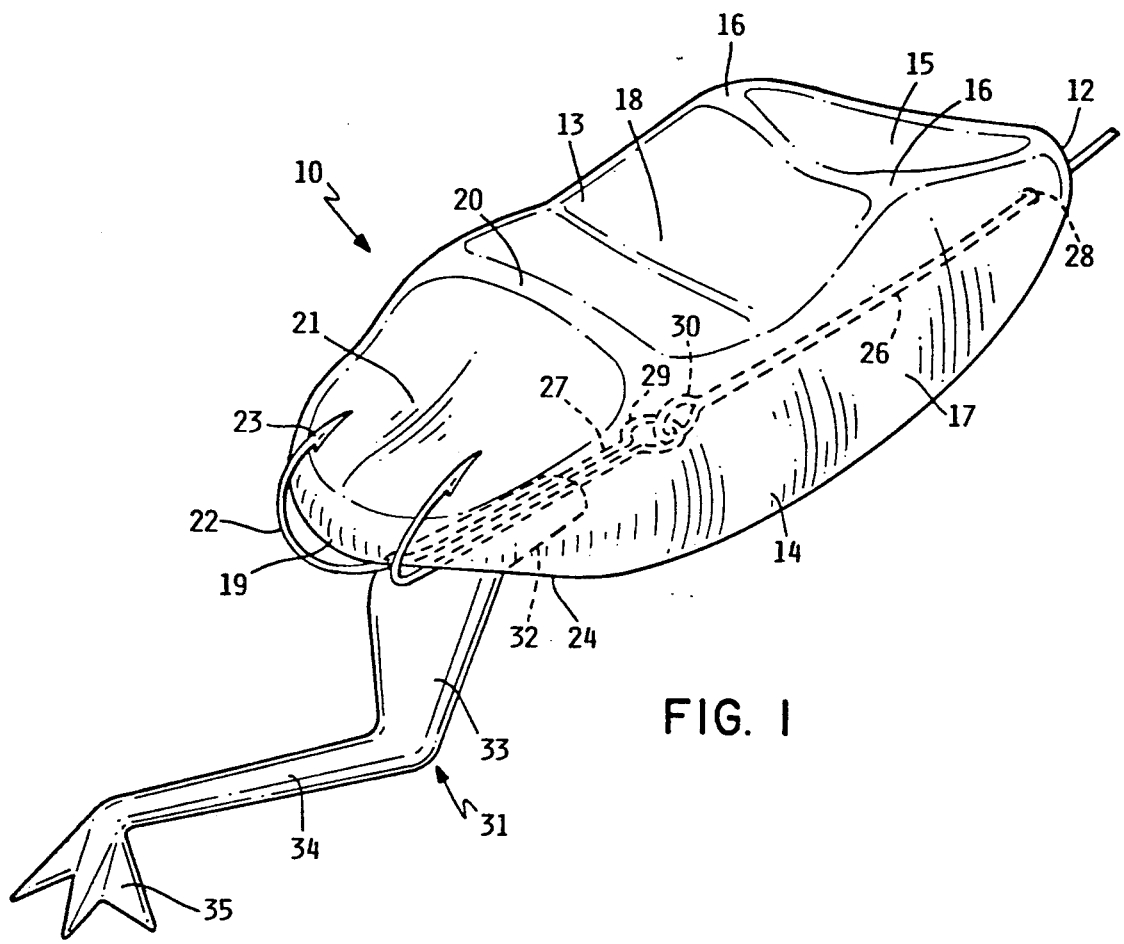
FIG. 1 is a perspective, partially phantom line view of the invention.
Figure 2:
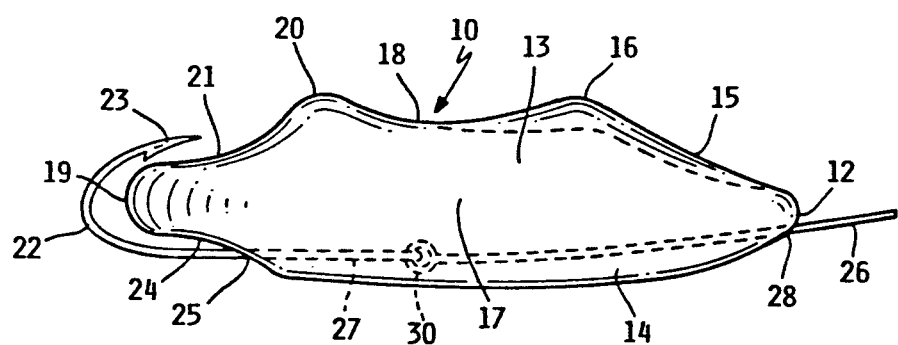
FIG. 2 is a partial elevation, partially phantom line view of the invention of FIG. 1.
Figure 4:
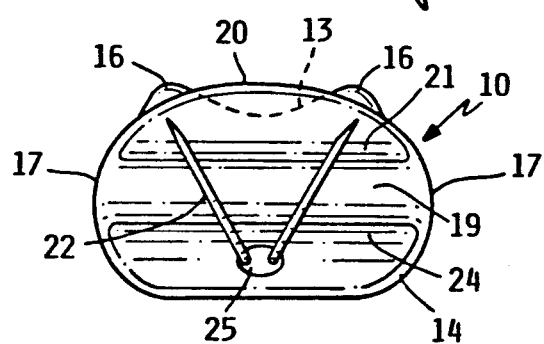
FIG. 4 is a rear partial elevation, partially phantom line view of the invention of FIG. 1.

As seen in FIG. 1, the body of the fishing lure 10 has a top side 13 and an underside 14. The top side 13 has a plurality of nodes and concave recess portions positioned in order to imitate the general appearance of a frog. In more detail the top side 13 at the proximal end 12 has a forward cavity recess portion 15 (FIGS. 1, 2). The forward cavity recess 15 is located centrally on the top side 13 at the proximal end 12 of the lure 10. The forward cavity recess 15 descends in a forward direction curving to meet and join with the forward upper edge of the underside 14. Immediately rearward to the forward cavity recess 15 is located a pair of centrally forward node portions 16 imitating the general shape of a frog's forehead eye socket anatomy. The nodes 16 are located adjacent the sides 17 of the top side 13. The nodes 16 are spaced equidistant from the proximal end 12 and from each other. The nodes 16 resemble the two eye sockets and cranial structural anatomy of a frog. The forward cavity recess 15 extends rearward between the two nodes 16 (FIGS. 1, 2, and 4). Immediately rearward of the pair of centrally forward nodes 16 is located a central cavity recess portion 18. The central cavity recess 18 is shaped and positioned to imitate the back anatomy of a frog. The central cavity recess 18 is shaped so that the lowest area of depression is located substantially central to the proximal end 12, distal end 19, and sides 17 of the top side 13. Immediately rearward to the central cavity recess 18 is located a central rearward node portion 20. The node 20 preferably extends across the entire width of the lure 10 between the sides 17 of the top side 13. Immediately rearward to the central rearward node 20 is located a rearward cavity recess portion 21. The rearward cavity recess 21 defines the distal end 19 of the top side 13. The node 20 in conjunction with the rearward cavity recess 21 forms a depression area for adjacent positioning of the barbed ends 23 of the hook 22. The rearward cavity recess 21 extends across the entire width of the top side 13 between the sides 17 descending rearward curving to meet and join with the rearward upper edge of the underside 14.

The underside 14 generally curves gradually upward joining the top side 13 at the proximal end 12. Preferably a majority of the underside 14 is substantially flat. The underside 14 contains a rearward cavity recess portion 24. The rearward cavity recess 24 curves generally upward, joining with the top side 13 at the distal end 19. The rearward curves of the cavity recess portions 21, 24 of the top side 13 and underside 14 are preferably reflections of each other about a central line, horizontally dividing the lure 10 substantially in half (FIG. 2).

Figure 3:
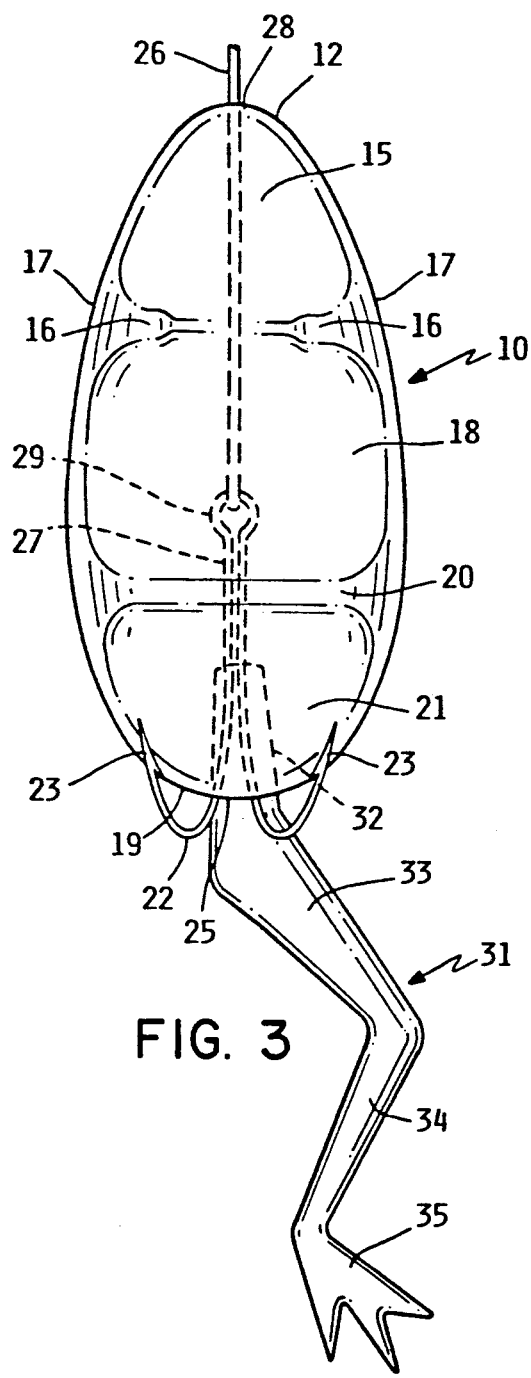
FIG. 3 is a top plan, partially phantom line view of the invention of FIG. 1.

The top side 13 and the underside 14 gradually curve downward and upward respectively, along the sides 17, forming the substantially ellipsoid shape of the lure body 10 (see FIGS. 3, 4).

An opening 25 is located substantially central the rearward cavity recess portion 24 of the underside 14. The opening 25 is preferably small and only of sufficient size to facilitate insertion of a leader 26, or shank portion 27 of a hook 22 (FIG. 2, 4).

An opening 28 is located substantially central to the proximal end 12 of the underside 14. The opening 28 is also preferably small and only of sufficient size to facilitate exit of a leader 26 or a shank portion 27 of a hook 22.

The openings 25, 28 may be established during the molding process of the lure 10, or may be fabricated into the lure 10 at a later time.

The openings 25, 28 are preferably constructed in order to maintain watertight integrity of the lure 10 after insertion and exit of the leader 26 or hook shank 27. The watertight integrity of the lure 10 will facilitate the flotation of the lure 10 upon the surface of a body of water. Any water located inside the lure 10 after use, may be removed by squeezing the top side 13 and underside 14 together while maintaining the distal end 19 is a downward position with respect to the proximal end 12.

The lure 10 is constructed to preferably remain in a configuration as shown in FIG. 1 with respect to the surface of a body of water. The existence of a hook shank 27 and/or leader 26 inside the hollow cavity of the lure 10 assists in maintaining the desired configuration of the lure 10 as the lure floats or is drawn over the surface of a body of water by a fisherman.

The lure 10 is preferably 1½-2 inches in length, ½-1 inch in width, and ½ inch in depth. The dimensions of the lure 10 may be enlarged or reduced as desired for use in fishing for a particular size or species of fish.

A double-pronged hook 22 having dual shank portions 27, barb portions 23, and an eye 29 is known in the art. The crippled frog fishing lure 10 may contain a hook 22 having either a short or long shank 27. If the shank portion 27 is of insufficient length to permit extension of the eye portion 29 through the opening 28 when the hook 22 and lure 10 are assembled as seen in FIGS. 2, 3, then a leader portion 26 will preferably be used. If the shank portion 27 is of sufficient length such that the eye portion 29 extends through the opening 28 to the exterior of the lure 10 when the hook 22 is inserted into the opening 25, then the shank portion 27 adjacent the eye 29 will preferably be bent at an acute angle approximately 45° exterior of the body of the lure 10.

The leader 26 preferably contains eyelets 30 located on opposite ends. An eyelet 30 will engage the eye 29 of the hook 22 if the hook shank 27 is of insufficient length to exit the opening 28 when inserted into the lure body 10. Preferably the leader 26 will be of rigid construction of stainless steel wire. The leader 26 will be bent at an acute angle of substantially 45° exterior of the lure 10 when engaged with the hook 22. The eyelet 30, opposite the eyelet engaged with the hook 22, may be suitably affixed to a fisherman's line.

The crippled frog fishing lure 10 has a trailing leg 31. The leg 31 is of molded construction shaped to anatomically resemble a frog's leg. The leg 31 contains a sleeve portion 32, an upper portion 33, a lower portion 34, and a webbed foot portion 35. The leg 31 is preferably molded from a resiliently flexible material of polyurethane plastic or rubber. The leg 31 is of one-piece construction.

The sleeve 32 is generally of a tight tubular construction while the remainder of the leg 31 is molded into a relatively flat solid structure. The sleeve 32 contains a slit 36 providing access to the tubular construction of the sleeve 32. Opposite the slit 36 is an opening 37 providing an exit to the sleeve 32. The slit 36 provides the access for engagement between the hook 22 or leader 26 to the leg 31.

The upper portion 33 is molded to the lower portion 34 at an obtuse angle substantially between 115° and 135°.

The webbed foot 35 is preferably molded to the lower portion 34 at a downturned angle of approximately 90°.

The leg 31 is designed in conjunction with the lure 10 to prevent rolling of the lure 10 about a longitudinal axis as the lure 10 is drawn over the water surface by a fisherman.

The leg 31 is designed for watertight engagement with the lure body 10 at the distal opening 25. The leg 31 is designed to attract fish by creating a water disturbance or a splash while traveling behind the drawn fishing lure 10. The splash is caused by friction between the surface of the water and the webbed foot 35.

The leg 31 is colored with the same or different color combinations preferred for the lure body 10.

Figure 5:
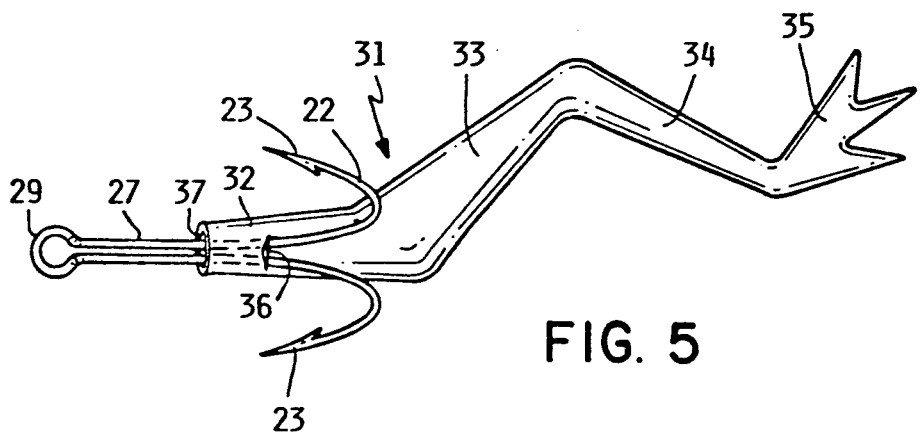
FIG. 5 is a detailed contour view of the hook and leg.
Figure 6:
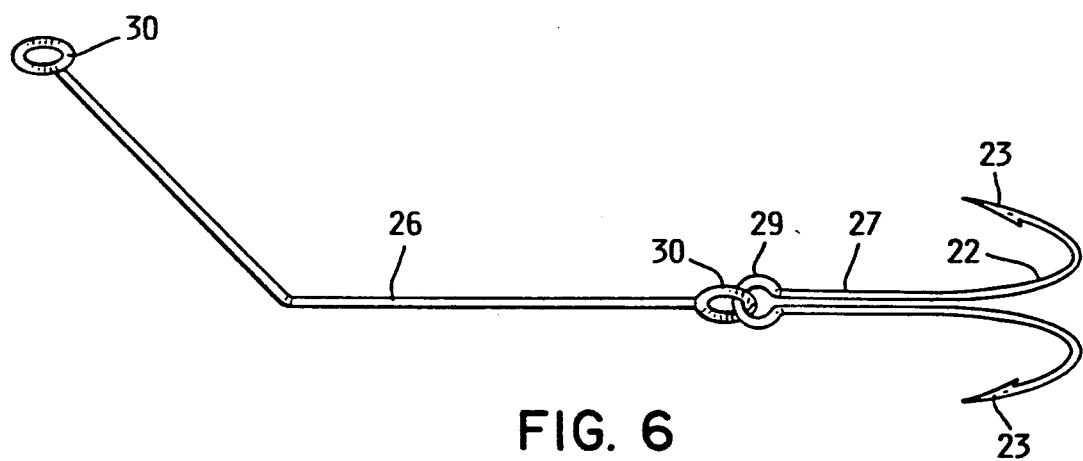
FIG. 6 is a detailed view of the leader and hook.

The hook 22 may be affixed to the leg 31 by insertion of the eye 29 into the slit 36. The hook 22 may then be extended through the tubular construction of the sleeve 32 by applying a pushing force moving the eye 29 through the opening 37 and sliding the sleeve 32 down the shank 27 toward the barbed ends 23 (FIG. 5). Preferably the sleeve 32 will fit in continuous, tight and flush contact with the shank 27 of the hook 22. In the alternative, a hook 22 affixed to a leader 26 may be attached to the leg 31 by substantially the same procedure. The eyelet 30 of the leader 26 opposite the hook 22 will be inserted into the slit 36. A pushing force will then move the eyelet 30 through the opening 37. The eyelet 30 may then be grasped by an individual and pulled while the individual maintains the sleeve 32 in a stationary position. The person may then pull the entire leader 26 thereby pulling the eye 29 and the shank 27 through the sleeve 32 for the desired distance. The sleeve 32 will fit in continuous, tight and flush contact with the shank 27 of the hook 22. Preferably the sleeve 32 will be engaged with the hook 22 such that the barbs 23 are positioned upwards with respect to the leg 31. In this configuration, the webbed foot 35 will extend downwards maximizing splash as the lure 10 is drawn across the water surface (FIGS. 1, 5). The joining of the leg 31 and the hook 22 in this manner positions the leg 31 in an accurate anatomical configuration imitating a natural frog upon engagement of the hook 22 and the leg 31 with the lure body 10.

The hook 22, with the affixed leg 31, may be assembled with the body of the lure 10 by inserting either the hook shank 27 or the leader 26 into the distal opening 25. Continued insertive force will exit the shank 27 or the leader 26 out of the proximal opening 28. A leader 26, upon exit from the proximal opening 28, may be grasped and pulled by an individual while maintaining the lure 10 in a stationary position. The shank 27 will be pulled into the hollow interior of the lure body 10 for a desired distance such that the barbs 23 are adjacent to the rearward cavity recess portion 21 (FIGS. 1, 2, 3). Preferably the sleeve 32 is drawn into the hollow interior of the body 10 such that the upper portion 33 of the leg 31 remains in flush contact with the rearward cavity recess 24 of the underside 14. After assembly, the leg 31 will imitate a naturally depending frog leg. The seal between the sleeve 32 and the distal opening 25 will preferably be watertight. The portion of the leader 26 extending forward of the proximal end 12 is then bent at an acute angle of approximately 45°.

If the shank 27 of the hook 22 with an affixed leg 31 is of sufficient length to exit the proximal opening 28, then the portion of the shank 27 containing the hook eye 29 extending forward of the proximal end 12 is then bent at an acute angle of approximately 45°. The barbs 23 shall remain in the same configuration adjacent the rearward cavity recess 21 of the top side 13.

The seal between either the hook shank 27 or the leader 26 with the opening 28 shall preferably remain watertight during the use of the lure 10 by a fisherman.

The existence of the shank 27 with or without an affixed leader 26 will be of insufficient weight to adversely affect the buoyancy of the lure 10 while used in fishing. The weight of the hook 22 and/or the leader 26 will add additional weight to the underside 14. The additional weight to the underside 14 assists in maintaining the lure 10 in an upright configuration with respect to the surface of the water. The underside 14 may also be molded of thicker construction than the top side 13 in order to assist in maintaining the lure 10 in a desired configuration.

The assembly of the lure 10 where the barbs 23 of the hook 22 are located adjacent the rearward cavity recess portion 21 facilitate the weedless character of the lure 10 while used in fishing. The rearward node portion 20 shields the barbs 23 from entanglement with marine vegetation or obstructions as the lure 10 is drawn over the surface of water. The assembly of the lure as shown in FIG. 1 is extremely efficient in maintaining the weedless character of the lure 10.

The depending leg 31 substantially prevents the lure 10 from rolling about a longitudinal axis during use. The depending leg 31 simultaneously attracts fish and stabilizes the lure as it is drawn over the surface of the water.

The bent angle of 45° of the shank 27 or the leader 26 enhances the motion of the lure 10 as drawn over the surface of the water. The angle of 45° in either the leader 26 or the shank 27 promotes movement of the lure 10 in a lateral direction as opposed to being drawn in a straight line to a fisherman. The lateral movement of the lure 10 imitates the zigzagged motions and course of an injured natural frog. The splash created by the depending leg 31 also imitates the motion of an injured natural frog and attracts fish. The eye 29 of the shank 27 may be bent in order to enhance lateral movement of the lure 10 as drawn over the surface of a body of water.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A fishing lure comprising a substantially hollow ellipsoid body, a trailing fishhook extending from said body, one leg member extending from said body rearwardly, wherein said body is comprised of a soft, durable, resiliently-flexible polyurethane plastic material, said body further comprising a substantially elliptical underside portion having an upturned forward end portion, and having a rearward concave cavity recessed end portion.

2. The lure of claim 1, wherein the body comprises a substantially elliptical top side portion having a forward end cavity recessed portion, a pair of centrally forward cavity node portions, a centrally located cavity recess portion, a centrally rearward cavity node portion, and having a rearward end cavity recess portion.

3. The lure of claim 2, wherein the fish hook comprises a dual-pronged hook portion having an elongated shank portion, an eye portion, and a pair of barbed portions, and the shank portion is inserted through the concave cavity recess portion of the underside body portion; the hook portion further positioned with the barb portions adjacent the rearward end cavity recess portion of the top side portion.

4. The lure of claim 3, further comprising a leader portion inserted through the upturned forward end portion of the underside portion of the body, and further connected to the eye portion of the hook.

5. The lure of claim 4, wherein the body and leg member are distinctly artistically colored leading to the appearance of a frog.

6. A fishing lure resembling an injured frog comprising a substantially resilient flexible, hollow ellipsoid body portion comprising:
   a) a substantially elliptical underside portion having an upturned forward end portion, and having a rearward end concave cavity recess portion;
   b) a substantially elliptical top side portion having a forward end cavity recess portion, a pair of centrally forward cavity node portions, a centrally located cavity recess portion, a centrally rearward cavity node portion, and having a rearward end cavity recess portion;
   c) a dual-pronged hook having an elongated shank portion, an eye portion, and a pair of barb portions, inserted through the concave cavity recess portion of the underside body portion, the hook portion further adapted for proximal positioning of the barb portions adjacent the rearward end cavity recess portion of the top side portion;
   d) a leader inserted through the upturned forward end portion of the underside body portion, and connected to the eye portion of the hook; and
   e) a resiliently flexible rearward protruding sleeve portion having an upper portion, a lower portion, and a webbed foot portion, the sleeve portion being attached to the shank portion of the hook, the sleeve portion being inserted through the rearward end cavity recess portion of the underside body portion.

7. The fishing lure of claim 6, further comprising a body portion comprised of soft, durable, resiliently flexible polyurethane plastic.

8. The fishing lure of claim 7, further comprising a sleeve portion comprised of soft, durable, resiliently flexible polyurethane plastic.

9. The fishing lure of claim 6, further comprising distinctive artistic colorings lending to the appearance of a frog.

10. A fishing lure comprising:
    a) a substantially hollow ellipsoid body portion having an underside portion comprising a distal end portion, the underside portion adapted to continuously align the fishing lure in a desired confirmation with the underside portion downward;
    b) a substantially hollow ellipsoid body portion having a top side portion comprising a plurality of node portions and a plurality of cavity recess portions, adapted to lend the appearance of an injured frog;
    c) a dual-pronged hook portion having an elongated shank portion, and barb portions, adapted for insertion of the shank portion through the distal end of the underside portion;
    d) a leader portion adapted for insertion through the body portion opposite the distal end portion; and
    e) a rearward protruding sleeve portion adapted for attachment to the distal end of the underside portion and further adapted to lend the appearance of a frog leg.

11. The fishing lure of claim 10, wherein the distal end portion of the underside portion comprises a concave cavity recess portion.

12. The fishing lure of claim 10, wherein the top side portion comprises a proximal end cavity recess portion, a pair of centrally forward cavity node portions, a centrally located cavity recess portion, a centrally rearward cavity node portion, and a distal end cavity recessed portion.

13. The fishing lure of claim 12, wherein the barb portions are positioned adjacent the distal cavity recess portion of the top side portion.

14. The fishing lure of claim 10, wherein the leader portion is adapted for positioning exterior the body portion having an angle of 45°.

15. The fishing lure of claim 10, wherein the frog leg comprises a resiliently flexible rearward extending sleeve portion having an upper portion, a joint portion, a lower portion, and a webbed foot portion.

16. The fishing lure of claim 15, wherein the frog leg is adapted for attachment of the sleeve portion to the shank portion, further adapted for positioning of the sleeve portion for watertight attachment to the body.

17. The fishing lure of claim 16, wherein the frog leg is comprised of a soft, durable, resiliently flexible polyurethane plastic material.

18. The fishing lure of claim 10, wherein the body is comprised of a soft, durable, resiliently flexible polyurethane plastic material.

19. The fishing lure of claim 18, wherein the underside portion is substantially elliptical having an upturned proximal end portion.

20. The fishing lure of claim 19, wherein the top side portion is substantially elliptical.

21. The fishing lure of claim 20, wherein the hook portion comprises an eye portion adapted for interaction with the leader portion.

22. The fishing lure of claim 21, wherein the body and frog leg are distinctly artistically colored leading to the appearance of a frog.

* * * * *